June 21, 1966  W. L. ROBB  3,256,675
METHOD AND APPARATUS FOR GAS SEPARATION BY
THIN FILMS OR MEMBRANES
Filed Nov. 30, 1962  2 Sheets-Sheet 1

Inventor:
Walter L. Robb,
by James J. Lichiello
His Attorney.

June 21, 1966 W. L. ROBB 3,256,675
METHOD AND APPARATUS FOR GAS SEPARATION BY
THIN FILMS OR MEMBRANES
Filed Nov. 30, 1962 2 Sheets-Sheet 2
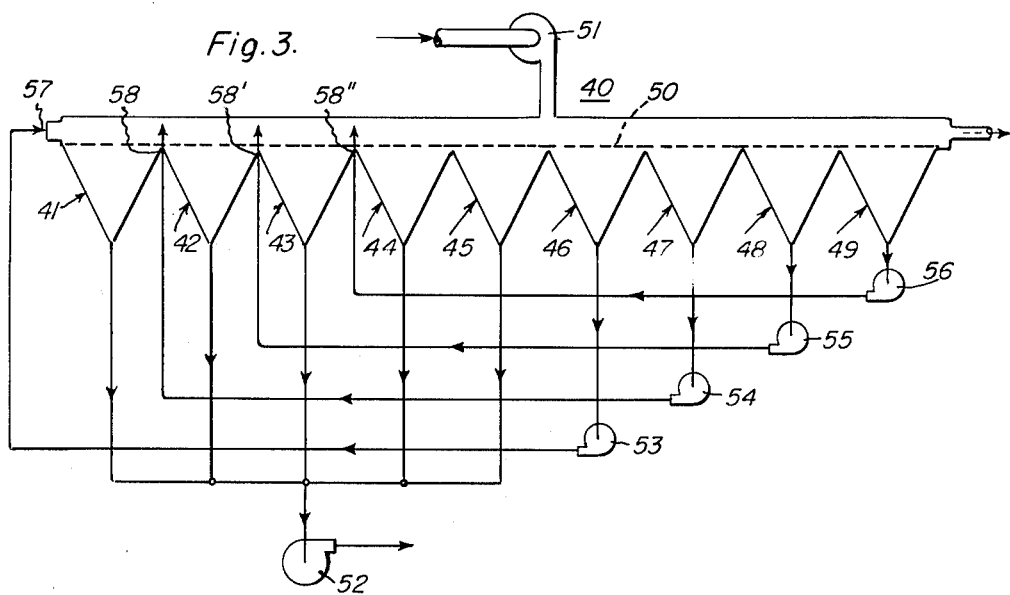
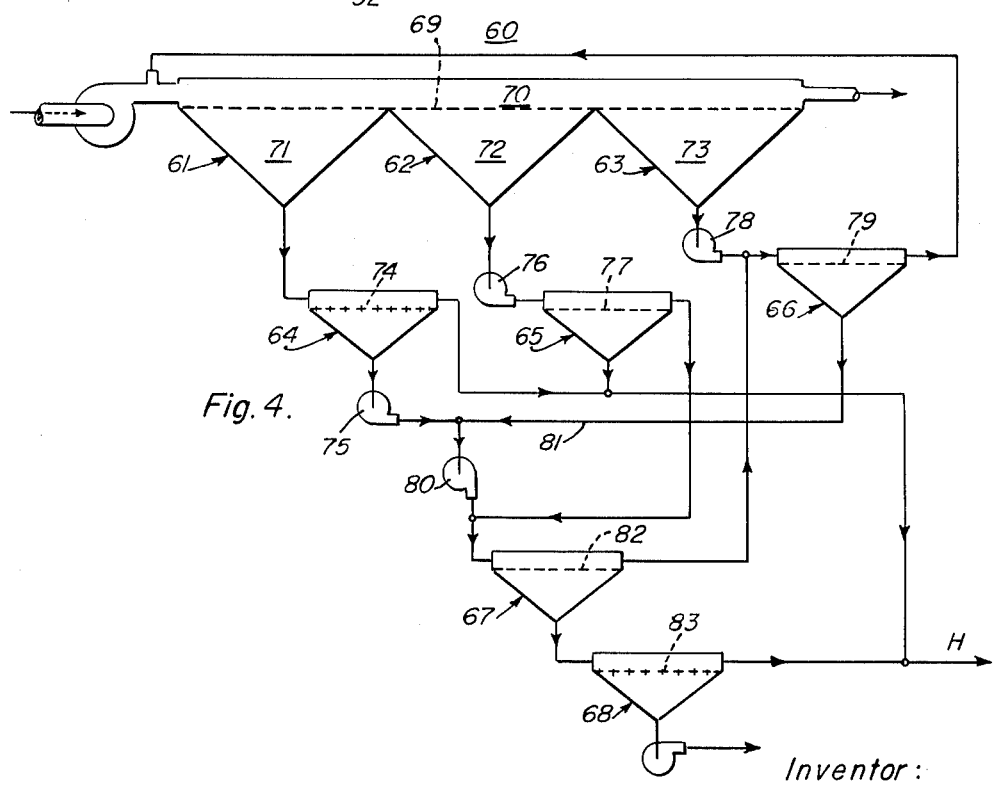
Inventor:
Walter L. Robb,
by James K. Lichiello
His Attorney.

United States Patent Office 3,256,675
Patented June 21, 1966

3,256,675
METHOD AND APPARATUS FOR GAS SEPARATION BY THIN FILMS OR MEMBRANES
Walter L. Robb, Scotia, N.Y., assignor to General Electric Company, a corporation of New York
Filed Nov. 30, 1962, Ser. No. 241,346
15 Claims. (Cl. 55—16)

This invention relates to the separation or enrichment of gases by permeation thereof through thin permeable films or membranes of a specific polycarbonate material. More particularly, this invention relates to the separation or enrichment of such gases as helium, from a mixture of gases including helium, or, oxygen or nitrogen from a mixture of gases including oxygen and nitrogen.

Separation, enrichment, or the resultant recovery is described as follows. In a separation process practiced on air for example, a considerable amount of oxygen and some small amount of nitrogen and other gases is withdrawn. The process may be described generally as separation of oxygen from a mixture of gases or that a gas is provided which is enriched in oxygen. The remaining gas may be referred to as enriched in nitrogen.

One important application of this invention is helium recovery. The recovery of helium from a natural gas mixture is becoming more important because of the increased and widespread usage of helium together with the fact that the supply of helium is limited. The mentioned natural gas recovery is important because the most substantial source of helium is in natural gas wells or sources where helium is present in a gas mixture. In this connection several helium recovery processes relating to charcoal adsorption, distillation, etc. are available, but these processes include various disadvantages such as high overall cost of the operation, required location, a high degree of complexity, and rather prohibitive operating parameters, such as high pressures and low temperatures.

This invention may also be applied to the separation of gases in air. As one example, where large quantities of an inert gas may be desirable, the separation of oxygen from air provides a gas considerably enriched in nitrogen.

Accordingly, it is an object of this invention to provide an improved gas separation or enrichment method and apparatus.

It is another object of this invention to provide gas separation or enrichment by means of thin permeable films of polycarbonate resin material.

It is an object of this invention to provide an improved helium separation or enrichment process utilizing thin permeable films of a polycarbonate resin.

It is another object of this invention to provide a permeable polycarbonate membrane process for the separation of helium from natural gas.

It is another object of this invention to provide a permeable polycarbonate membrane process for the separation of helium from air.

It is a still further object of this invention to provide a permeable polycarbonate membrane process for the separation of the constituent gases in air.

Briefly described this invention comprises the use of a thin film or membrane of a polycarbonate material as a barrier or permeable membrane for a mixture of gases, and providing separation or enrichment by diffusion of one or more of the gases through the membrane.

This invention will be better understood when taken in connection with the following description and the drawings in which:

FIG. 3 is a schematic illustration of a plural membrane recovery device which may be utilized to recover helium from natural gas; and FIG. 4 is a schematic illustration of a process and apparatus utilized for extracting helium from a helium rich gas containing a considerable amount of both $N_2$ and $CH_4$.

Figure 1:
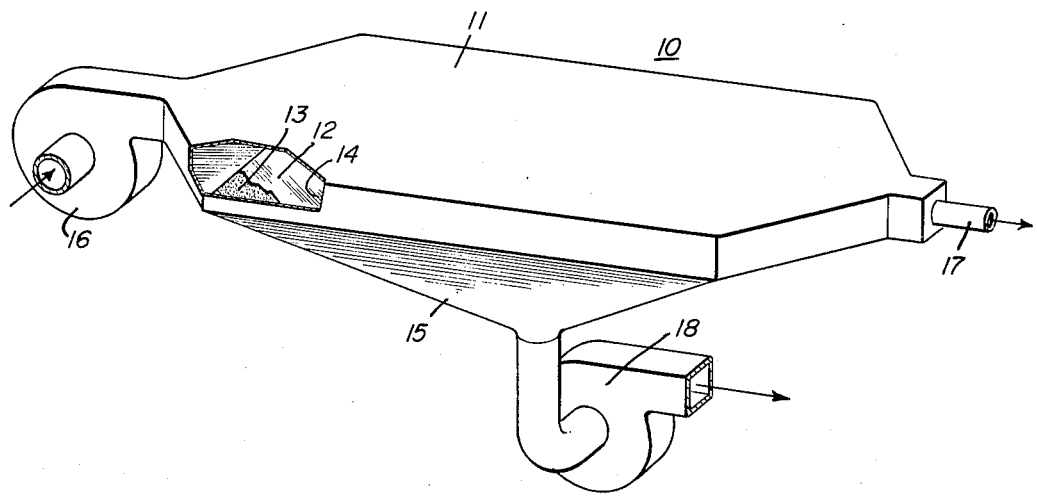
FIG. 1 is an exemplary apparatus utilized to illustrate the gas selectivity of a polycarbonate membrane.

Thin membranes of polycarbonate resin may be used in a separator device to separate different gases. It has been discovered that polycarbonate resin membranes provide exceptional selectivity characteristics to the permeation of specific gases therethrough, more notably with respect to helium where the separation is from a mixture of gases containing helium, and where the mixture consists generally of gases of compounds of carbon and hydrogen, such as for example $CH_4$, $C_2H_6$, $C_2H_4$, $C_3H_8$, etc.

Thin polycarbonate films are also selective with respect to other gases more particularly nitrogen so that these films may be employed in the separation of nitrogen from a mixture of gases, air for example.

One polycarbonate resin material of this invention comprises a linear polymer comprising recurring structural units of the formula I
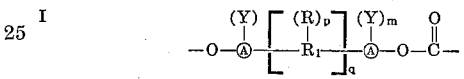

where R is a monovalent hydrocarbon radical; $R_1$ is selected from the group consisting of an alkylene and an alkylidene residue; A is the residue of an aromatic nucleus; Y is a chemical constituent selected from the group consisting of (a) inorganic atoms (b) inorganic radicals and (c) organic radicals; m is a whole number equal to from 0 to a maximum determined by the number of replaceable nuclear hydrogens substituted on the aromatic hydrocarbon residue A; p is a whole number equal to from 0 to a maximum determined by the number of replaceable hydrogens on $R_1$; and q is a whole number equal to from 0 to 1 inclusive.

One method of preparing these resins comprises effecting reaction between (1) a dihydroxydiaryl compound of the formula II
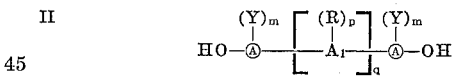

and (2) a diaryl carbonate of the formula

II

where R is a monovalent hydrocarbon radical; $R_1$ is selected from the group consisting of an alkylene and an alkylidene residue; A is the residue of an aromatic nucleus; Y and Z are chemical substituents selected from the group consisting of (a) inorganic atoms (b) inorganic radicals and (c) organic radicals, (a), (b) and (c) being inert to and unaffected by the reactants and by the reaction of the dihydroxydiaryl compound and the diaryl carbonate; m and n are whole numbers equal to from 0 to a maximum equivalent to the number of replaceable nuclear hydrogens substituted on the aromatic hydrocarbon residue A; p is a whole number equal to from 0 to a maximum determined by the number of replaceable hydrogens on the alkylene or alkylidene residue; and q is a whole number equal to from 0 to 1 inclusive.

In the above formula for the dihydroxydiaryl compound (hereinafter employed as a designation for the compound defined in Formula II), the inert substituents designated by Y on each aromatic hydrocarbon residue may be the same or different, and R's may also be the same or different; the number of Y's on each respective aromatic hydrocarbon nucleus residue A may also be varied if desired so that a symmetrical or an unsymmetrical compound be formed. The Z's in the diaryl carbonate defined by Formula III may also be the same or different, and the number of substituents represented by Z may be the same on each aromatic nucleus A, or may vary depending upon the degree of substitution desired on each aromatic residue A.

Among the monovalent hydrocarbon radicals which R may represent are, for instance alkyl radicals (e.g., methyl, ethyl, propyl, isopropyl, butyl, decyl, etc.), aryl radicals (e.g., phenyl, naphthyl, biphenyl, tolyl, xylyl, ethylphenyl, etc.), aralkyl radicals (e.g., benzyl, phenylethyl, etc.), cycloaliphatic radicals, (e.g., cyclopentyl, cyclohexyl, etc.), as well as monovalent hydrocarbon radicals containing inert substituents thereon, for instance, halogens (e.g., chlorine, bromine, fluorine, etc.). Among the aromatic nuclei which A may represent are, for instance, the aromatic hydrocarbon residues based on benzene, biphenyl, naphthalene, anthracene, etc. The final configuration of this aromatic hydrocarbon residue in the molecule is determined by the nuclearly-substituted hydroxyl groups, together with any nuclearly-substituted hydrogen atoms and the number of inert substituents represented by either Y or Z.

Examples of $R_1$ as an alkylene or alkylidene residue are, for instance, methylene, ethylene, propylene, propylidene, isopropylidene, butylene, butylidene, isobutylidene, amylene, isoamylene, amylidene, isoamylidene, etc. When $p$ is zero, the valence requirements of the carbon skeleton of the alkylene or alkylidene residue are completely satisfied with hydrogens. When $p$ is greater than zero, hydrogens fulfill the valence requirements of the carbon skeleton not satisfied by the R's.

Among the inert substituents which Y and Z may represent are, for instance, halogens (e.g., chlorine, bromine, fluorine, etc.); organoxy radicals of the formula OW, where W is a monovalent hydrocarbon radical similar to those recited for R; and monovalent hydrocarbon radicals of the type represented by R. Other inert substituents included within the scope of Y and Z, such as the nitro group, may be substituted on the aromatic nuclear residue A without departing from the scope of the invention.

In the above formulae, $m$ and $n$ may be zero whereby the aromatic nuclear residues A will be unsubstituted except for the hydroxyl group in regard to Formula II, or else there may be a plurality of substitutions of inert substituents on the aromatic nuclear residues depending upon the number of nuclearly bonded hydrogens remaining on A, taking into consideration the presence of the hydroxyl group in Formula II. Where $q$ is zero the aromatic nuclei will be directly joined without the presence of an alkylene or an alkylidene bridge.

The position of the hydroxyl groups, Y, and Z on the aromatic nuclear residue A, may be varied in the ortho, meta or para positions, and the groupings may be in a vicinal, asymmetrical, or symmetrical relationship, where two or more of the nuclearly-bonded hydrogens of the aromatic hydrocarbon residue are substituted with, for instance, Y, the hydroxyl group in Formula II.

One method of preparing a polycarbonate resin linear polymer is given in the following example:

*Example 1*

This example is illustrative of the reaction of equimolar ratios of technical grades of bisphenol-A and diphenyl carbonate.

Equimolar ratios of bisphenol-A,

IV 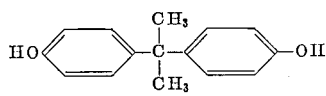

(114 parts) and diphenyl carbonate,

V 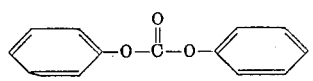

(107 parts), were charged to an oil bath heated reactor equipped with a stirrer, an inert gas inlet, a condenser-receiver system connected to a vacuum means for creating subatmospheric pressure. Nitrogen was slowly allowed to enter the reactor system to which vacuum was gradually applied. Initial distillation of phenol began when the bath temperature reached 185–190° C., (after ½ hour of heating) and continued rapidly for 1–1.5 hours at this temperature and a pressure of 10 mm. during which time most of the phenol was evolved. The temperature of the heating bath was then slowly raised to 290° C. under the nitrogen-reduced pressure system (about 10 mm.) and held at this point for about 5 additional hours during which time the viscosity of the reaction mixture increased. Long fibers could be drawn from the hot melt. The carbonate resin product (melting point 280–300° C.) comprised recurring units of the formula

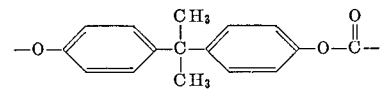

The resin had an intrinsic viscosity of 0.355 as determined in p-dioxane at a temperature of 30.3±0.1° C. using an Ostwald viscometer, hereafter referred to as "p-dioxane 30.3±0.1° C."

Further examples of polycarbonate resins or poly(di monohydroxy arylene alkane carbonate), i.e. a polycarbonate resin of a bis(monohydroxyaryl)alkane may be found in copending application Serial No. 598,768, Fox et al., filed July 19, 1956, now Patent No. 3,148,172, issued Sept. 8, 1964 and assigned to the same assignee as the present invention, and incorporated by reference herewith. Other polycarbonate resins and methods of preparation are found in U.S. Patents 2,964,794 and 2,950,266. More specifically, one preferred polycarbonate resin is commercially available and produced by the General Electric Company under the registered trademark "Lexan."

An example of gas separation in a preferred form of this invention is described in relation to FIG. 1. In FIG. 1 there is illustrated an exemplary permeable membrane device 10 for specific gas separation or enrichment. Device 10 includes a channel or duct member 11 adapted for passage of a gas therethrough. In duct 11 there is positioned a permeable membrane 12 of the polycarbonate resin of this invention. The membrane 12 may be from about 0.03 to 1.0 mil thickness with the thinner films providing better results. Such a membrane rests upon a suitable perforated or porous support member 13 and thus defines an upper duct or chamber 14 through which a gas mixture flows and a lower portion or chamber 15 which is sealed from the gas flow in the upper portion of the duct so that any gas entering chamber 15 must pass through membrance 12. A helium containing gas, for example, is introduced into duct 11 by a suitable flow means such as a pump or compressor 16 to pass therethrough and exhaust through exit 17. In order to provide more positive transfer or permeation of helium through the permeable membrane 12, chamber 15 is connected to a suitable low pressure device such as a vacuum pump or compressor 18. By this arrangement a measured amount of a gas mixture passes through duct 11 over a predetermined area of permeable membrane 12 with a certain fraction of the gas permeating membrane 12 and being removed by pump 18.

The low pressure conditions in chamber 15 accelerate the permeation of gases and helium enriched gas is obtained at the compressor 18 outlet. The degree of enrichment is dependent on such variables as amount of helium in the gas flowing through apparatus 10, the entering gas pressure in chamber 14, and the vacuum or low pressure conditions in chamber 15. More importantly, the degree of enrichment depends on the permeation rate of a given gas such as helium through the membrane relative to the permeation rate of a gas mixed with the helium.

Where the permeation rate for one gas is substantially different than that of another gas, much more of the one gas flows through the membrane in the equivalent period of time.

The units of permeability as employed are in the metric system and follow the relationship at a given temperature of $$P = \frac{(\text{std. cc.})(\text{cm.})}{(\text{sec.})(\text{cm.}^2)(\text{cm. Hg } \Delta p)}$$

where std. cc. is a volume of the permeating gas, cm. is the thickness of the membrane, sec. is the time in seconds for a given amount of gas to be permeated, cm.$^2$ is the area of the membrane, and cm. Hg $\Delta p$ is the pressure difference over the membrane in cm. of Hg. The measurement of permeabilities of the various gases is obtained by simple test and calculation. For the permeability determinations of this invention, a polycarbonate membrane is clamped in a simple permeation cell where both sides of the membrane may be degassed by applying low pressure or vacuum conditions on each side. Then a gas at known pressure is introduced to one side of the membrane while the low pressure side leads to a McLeod gage and a pressure rise indicates permeation rate. For gas mixtures, the low pressure side may be connected to a mass spectrometer where the gas is analyzed and rate of permeation measured.

It has been found in the practice of this invention that polycarbonate materials as above described have the following permeability constants as given in Table 1.

TABLE 1.—PERMEABILITY CONSTANTS IN BISPHENOL A POLYCARBONATE RESIN FOR VARIOUS GASES AT 26° C.

| Gas | pr $\frac{\text{cc. gas, cm. thickness}}{\text{sec., sq. cm., cm. Hg} \Delta p}$ | |
|---|---|---|
| He | 1.5 | $\times 10^{-9}$ |
| CH$_4$ | 0.045 | $\times 10^{-9}$ |
| C$_2$H$_4$ | 0.08 | $\times 10^{-9}$ |
| C$_2$H$_6$ | 0.04 | $\times 10^{-9}$ |
| C$_3$H$_8$ | 0.02 | $\times 10^{-9}$ |
| N$_2$ | 0.037 | $\times 10^{-9}$ |
| H$_2$ | 1.4 | $\times 10^{-9}$ |
| CO$_2$ | 1.2 | $\times 10^{-9}$ |
| O$_2$ | 0.17 | $\times 10^{-9}$ |

It can be seen from the above table, that a polycarbonate resin membrane is far more permeable to helium than, for example CH$_4$, C$_2$H$_4$, C$_3$H$_8$ and thus helium may be effectively removed from a mixture of these gases by the use of such a membrane. In addition it is noted that helium permeates this membrane about 40 times as easily as nitrogen and about 9 times as easily as oxygen. It is understood, however, that various factors such as temperature, the crystallinity of the material or the amount of the crystallinity or other features in the polycarbonate resin curing process may affect permeability. There are also variances in permeability in polycarbonate resins produced from different processes. These variances as mentioned are of minor nature and do not affect the basic differences in permeability as set forth.

Figure 2:
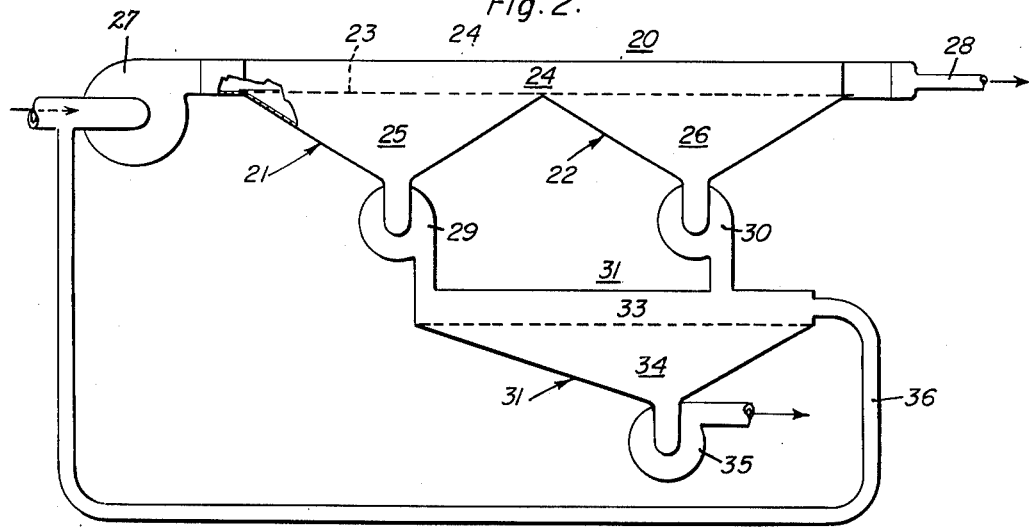
FIG. 2 is an illustration of a two-stage helium recovery device to recover helium from air.

A simple apparatus 10 of the type described in FIG. 1 will suffice in many instances where permeability provides sufficient gas separation or enrichment in a single pass. A higher degree of separation or a higher degree of purity may be obtained where more than one such apparatus 10 is employed as illustrated in FIG. 2. Referring now to FIG. 2, there is illustrated a plural unit separator device utilized to obtain helium from gases containing helium. This device is also particularly adaptable for separation of helium from air. In FIG. 2 the plural separator unit 20 is a two-stage separator which includes a pair of the separator units of FIG. 1 as 21 and 22 as the first stage. A common polycarbonate membrane member 23 is employed to define an upper chamber 24 and a pair of lower chambers 25 and 26. A gas containing helium is introduced into the upper chamber 24 by means of blower or pump 27 and exits through exhaust opening 28. At the same time low pressure conditions are established in lower chambers 25 and 26 by means of suitable pumps or compressors 29 and 30. As one example, the pressure in chamber 24 is about 10 atmospheres while the pressure in chambers 25 and 26 is maintained at about 0.1 atmosphere. The second stage of this unit comprises a modified FIG. 1 type unit 31 having separate inlets for both pumps 29 and 30. Unit 31 includes a polycarbonate membrane 32 which defines upper chamber 33 and lower chamber 34. Pumps 29 and 30 from the first stage units provide a gas mixture enriched in helium to chamber 33 at about 5 atmospheres pressure. A pump or compressor 35 reduces pressure in lower chamber 34 to about 0.1 atmosphere and produces at its exit a substantially helium enriched gas which is then stored. The exit flow from the second stage unit from chamber 33 by means of exit 36 is directed to the inlet of the first stage pump 27. It is of course understood that the polycarbonate membranes are suitably supported by porous slabs, screens, etc. However, since thin films of polycarbonate resins have considerable strength, the noted pressures may be higher and thus separation increased and film area reduced. For example, it has been found that helium permeates through a polycarbonate resin membrane up to about 33 times the rate of methane, but with an increase in pressure to about 500 p.s.i.g. the rate increased to about 49.5 times the rate of methane. Increased ratios were also noted between helium and other gases at increased pressures.

Such units as described for FIGS. 1 and 2 are only effective because of the permeability characteristics of thin films of polycarbonate resin and the wide difference in permeability specifically between gases as described. Advantages of the unit of FIG. 2 apparatus over that of FIG. 1 are that the desired gas can be concentrated to higher purity using more than one stage, and the polycarbonate membrane area can be considerably reduced by compressing the incoming gas. Furthermore, the compressive work may be reduced by having several units or cells in each stage.

As one example, a helium recovery unit of FIGS. 1 or 2 may be operatively connected to a closed room containing, for example two men, and where helium is being evolved from the operation of various apparatuses such as, for example a cryostat, an inert arc welding bulb, etc. In many of these instances, helium is being produced, evolved or used at the rate of 0.6 s.c.f./minute which presently involves about $40/day in value of helium lost. By assuming about 12½ cubic feet of air being removed from the room for ventilating purposes, the CO$_2$ content of this air will be about 0.24 percent, oxygen about 20.5 percent, and helium 5 percent. About 90 percent of this helium may be recovered by a use of a one-stage cell as described with respect to FIG. 1 which would enrich the helium to 34 percent. Such a device would require approximately 150 square yards of a 0.1 mil thick polycarbonate resin membrane and about 3.85 H.P. compressive work, or, 900 square yards of polycarbonate resin membrane and 1.25 H.P. compressive work. A two-stage cell, i.e., a FIG. 2 arrangement would enrich the helium to 75 percent. Such a latter unit would require about one fourth more membrane area than previously mentioned together with an increase of about ¼ for compressive work. S.c.f. is a standard cubic foot.

Additionally, a three or more stage cell could also be employed where the three-stage system includes about a 10 percent increase in area and power. Helium enrichment would be greater than about 90 percent. In all instances, the portion of the area of the membrane utilized together with the compressor power is predicated upon the desired enrichment and the amount of helium available in the incoming gas. Where helium separation is concerned, it is ordinarily desirable to provide a gas containing about 65 percent helium. This gas is then stored at this percentage and further separation is carried out by other processes which are more economical and satisfactory when operating with an original gas mixture of 65 percent helium.

With the apparatus as described for FIGS. 1 and 2, various gas separation and enrichment processes may be carried out. Such processes and the efficiencies thereof are dependent on the permeability characteristics of the polycarbonate resin which respect to the different gases and the specific mixtures. Referring to the values given in Table 1, a gas having a higher permeability constant may be separated from a gas or mixture of gases having lower constants. A greater difference in the numerical values in the table is indicative of higher efficiency separation. As applied to more salient or important processes, helium recovery or separation from natural gas is quite evident as well as oxygen separation from air for example. These processes also provide a gas or gases depleted in helium or a gas or gases enriched in nitrogen for example.

As mentioned, a preferred use of the teachings of this invention is the separation of helium from a hydrocarbon gas or from natural gas. Where the permeabilities are substantially different, helium may be separated from these gases by the practice of this invention disclosed in connection with the use of the apparatus of FIGS. 1 and 2. This ordinarily provides a gas which is considerably enriched in helium.

A further exemplary application of this invention is described in reference to a gas mixture containing 1 percent helium and 99 percent $CH_4$ and where the product of recovery should be about 65 percent helium, this being the concentration of helium presently used in underground storage sites. A process and apparatus in this connection are illustrated in FIG. 3. Referring now to FIG. 3, apparatus 40 includes a plurality of individual units such as shown in FIGS. 1 and 2. Nine such units, 41 through 49, are serially arranged and provided with a polycarbonate membrane 50 of 0.1 mil thickness and an area of 1400 sq. yds. per c.f.m. of helium. Feed gas is introduced into apparatus 40 by pump 51. Feed gas pressure may be about 300 p.s.i.g. or, the natural gas may be passed through the apparatus at the pressure to which it is compressed for delivery to tanks or to pipe lines. This may be as high as 1500 to 2000 p.s.i.a.

A pump or compressor 52 is connected by means of a common header to the first five units, 41, 42, 43, 44, and 45 for helium recovery. Helium recovery from the first unit is 88 percent helium in unit 41, 81 percent helium in unit 42, 71 percent helium in unit 43, 58 percent helium in unit 44, and 39 percent helium in unit 45. Pump 52 thus provides a product stream of about 65 percent helium. The gas recovered from units 46, 47, 48, and 49 is recycled by their respective pumps 53, 54, 55, and 56 to the entrances 57, 58, 58', and 58" respectively of units 46, 47, 48, and 49. Helium recovery from units 46, 47, 48, and 49 is 21 percent helium in unit 46, 13 percent helium in unit 47, 8 percent helium in unit 48, and 5 percent helium in unit 49. Such a plant requires about 3 H.P. compressive work/c.f.m. of helium.

For other gas separations or where permeability rates for different gases are relatively close good separation may require the use of not only a plurality of the units of FIGS. 1 and 2, but also a plurality of or combination of different membranes. One particular membrane employed for removal or separation of $CO_2$ is a silicone rubber membrane as set forth in U.S. Patent 2,966,235—Kammermeyer. In one of the preferred uses for this invention, i.e., that of separating helium from natural gas, the natural gas may contain some $CO_2$ and thus the combination of a silicone rubber membrane and the polycarbonate resin membrane of this invention provides excellent results. For example, such a unit for the recovery of helium from natural gas containing high amounts of $CO_2$ is disclosed in FIG. 4.

Referring now to FIG. 4, there is disclosed an apparatus 60 which comprises eight separation units 61, 62, 63, 64, 65, 66, 67, and 68. Units 61, 62, and 63 are equipped with preferably a suitably supported common polycarbonate resin membrane 69 defining an upper chamber 70, that is, the area above the membrane 69 and lower chambers 71, 72, and 73 for each of the separators 61, 62, and 63. Feed gas is introduced into the top chamber 70 at one end thereof. A good example of a feed gas is a natural gas stream containing about 7.3 percent helium, 49 percent nitrogen, 35.3 percent $CH_4$, 6 percent $C_xH_y$ (i.e., various other hydrocarbons) and 2.2 percent $CO_2$. This feed gas is compressed to about 300 p.s.i.g. and introduced into chamber 70 above the three units 61, 62, and 63. The pressure in the lower chambers 71, 72, and 73 is maintained at about 1 atmosphere so that the large pressure difference between upper and lower chambers permits a high flow rate of helium through membrane 69 and into chambers 71, 72, and 73.

The gas from chamber 71 which is enriched in helium is further introduced into a second stage unit 64 at a pressure of 1 atmosphere above a membrane 74. In this instance, membrane 74 is of silicone rubber and is employed to remove the $CO_2$ from the incoming gas. The gas pressure below membrane 74 is maintained at about 0.05 atmosphere by means of pump 75. The gas from above membrane 74 having $CO_2$ removed therefrom, is passed to the product stream at H.

From the lower chamber 72 of unit 62, which is maintained at a pressure of 1 atmosphere by means of a pump 76, helium enriched gas is provided to further unit 65 at a pressure of 20 atmospheres above a polycarbonate membrane 77 so that a second stage helium recovery unit is employed. From below membrane 77 helium enriched gas is provided to the product stream at H.

From lower chamber 73 of unit 63, the gas which has permeated membrane 69 is enriched in helium, and is removed from chamber 73 by pump 78. Pump 78 then supplies the helium enriched gas to second stage unit 66. Pump 78 maintains the chamber above the polycarbonate membrane 79 in unit 66 at a pressure of about 20 atmospheres, while the pressure below membrane 79 is maintained at about 1 atmosphere. The exhaust gas from unit 66 is returned to the entering feed gas in the process for recycling. The helium enriched gas from unit 66 is thereafter removed by means of pump 80 which is so connected in line 81 to also remove the $CO_2$ enriched gas from auxiliary unit 64 which has removed much of the $CO_2$ from the gas.

At this point the helium content of the gas from below membrane 74 in unit 64 is relatively low because little helium has permeated membrane 74. The helium content of the gas being taken from unit 66 is also relatively low because most removal has occurred in units 61 and 62. Therefore, pump 80 supplies the gas from the two mentioned sources to a further separator unit 67 for more separation by means of a polycarbonate membrane 82. In unit 67, the pressure above membrane 82 is about 20 atmospheres and the pressure below membrane 82 is about 1 atmosphere. Because of substantial amounts of $CO_2$ in the gas from unit 67, the gas from below membrane 82 is passed into unit 68 containing a silicone rubber membrane 83. In unit 68 the pressure above membrane 83 is about 1 atmosphere while the pressure below the membrane is about 0.05 atmosphere. The product of unit 68 is a gas stream from below membrane 83 which is enriched in $CO_2$ and a gas stream from above membrane 83 which is enriched in helium and is added to the product stream at H.

The gas taken from above membrane 77 in unit 65 is also introduced into the stream entering unit 67 for further helium separation and $CO_2$ separation in unit 68.

The gas taken from above membrane 82 in unit 67 is returned to the gas stream entering unit 66 for further helium removal and recycling.

The product stream at H contains a gas including about 65 percent helium. These results are obtained with a total membrane area of 260 square yards/c.f.m. He and compressor work input of 0.7 H.P./c.f.m. He.

The system may be alternately described in that the gas in the first unit 61 at the initial part of the process has a high helium content and passes through a polycarbonate resin membrane 69 in unit 61 for helium enrichment. The helium enriched gas is then added to the product stream of 65 percent helium. The gas from unit 62 in order to contain about the same helium content, passes through two stages, i.e., polycarbonate resin membrane 69 of unit 62 and polycarbonate resin membrane 77 of unit 65. This gas is then added to the product stream at H at nearly 65 percent helium. The gas in unit 63 passes through three separating procedures, (1) by means of polycarbonate resin membrane 64 of unit 63, (2) by polycarbonate resin membrane 79 in unit 66, and (3) by polycarbonate resin membrane 82 in unit 67. The resultant stream is added to the final product stream at about 65 percent helium. The exhaust or raffinate from the first three units, 61, 62, and 63, contains about 0.25 percent helium and is discharged or otherwise employed in other processes if so desirable. It is obvious that where the amount of $CO_2$ in the natural gas is slight, that the silicone rubber membranes need not be employed.

It can thus be seen that the objects of this invention are carried out by means of gas permeation through thin films of a polycarbonate membrane having permeability characteristics suitable for the separation of, for example, helium from helium containing gases, and more particularly for the separation of helium from hydrocarbons or natural gas containing helium. A further example refers to the obtaining of a gas enriched in oxygen or nitrogen, particularly from the atmosphere. Additionally, where the permeability factors for the separation of gases are such that other gases such as carbon dioxide also permeates the particular membrane of this invention, then the said membrane is used in combination or in conjunction with additional membranes, more particularly, for example, silicone rubber membranes for removal of these other gases and to increase the richness of the helium gases as a product of this invention.

While a particular method and apparatus has been disclosed as exemplary for carrying out the process of this invention, it is not intended that the invention be limited to the particular description nor to the particular configurations illustrated or method described, and it is intended by the appended claims to cover all modifications within the spirit and scope of this invention.

What I claim as new and desire to secure by Letters Patent of the United States is:

1. The method of separating one of the gases taken from a class consisting of helium and oxygen from a mixture containing one of said gases which comprises the steps of bringing the mixture into contact with one side of a thin, permeable membrane consisting essentially of a polycarbonate resin of a bisphenol alkane; maintaining a pressure differential across said membrane between said one side and the opposite side of said membrane with the lower pressure being on said opposite side thereby causing a portion of the mixture to permeate through said membrane, and removing the enriched gaseous product.

2. A method of separating helium from a gas mixture containing helium and at least one other gas, comprising the steps of bringing the mixture into contact with one side of a thin membrane consisting essentially of a polycarbonate resin of a bisphenol alkane, maintaining a lower pressure on the opposite side of said membrane relative to the pressure on said one side thereof thereby causing a portion of the mixture to permeate through said membrane, and removing helium enriched mixture from the opposite side of said membrane.

3. The method recited in claim 2 wherein said mixture contains at least one of the gases taken from the class consisting of hydrocarbon gases, $O_2$ and $N_2$.

4. The method as recited in claim 2 wherein said at least one other gas is $CH_4$.

5. The method as recited in claim 2 wherein said at least one other gas is $C_2H_4$.

6. The method as recited in claim 2 wherein said at least one other gas is $C_3H_8$.

7. The method as recited in claim 2 wherein said at least one other gas is $C_2H_6$.

8. The method as recited in claim 2 wherein said at least one other gas is $CO_2$.

9. The method as recited in claim 2 wherein said at least one other gas is $O_2$.

10. The method as recited in claim 2 wherein said at least one other gas is $N_2$.

11. The method of separating helium recited in claim 2 wherein the helium is separated from helium enriched air.

12. The method of separating helium recited in claim 2 wherein the helium is separated from helium enriched air and wherein the helium enriched mixture is subjected to the folowing steps: bringing the more helium enriched mixture into contact with one side of a thin nonporous membrane consisting essentially of silicone rubber, reducing the pressure on the opposite side of the silicone rubber membrane causing a portion of the helium enriched mixture to permeate through said silicone rubber membrane, and removing a further helium enriched mixture from the said one side of said silicone rubber membrane.

13. The method of separating helium recited in claim 2 wherein the helium is separated from natural gas.

14. The method of separating oxygen from an oxygen-nitrogen mixture comprising, bringing said mixture into contact with one side of a thin non-porous polycarbonate resin membrane as recited in claim 2, reducing the pressure on the opposite side of said membrane relative to the pressure on said one side thereof thereby causing a portion of the mixture to permeate through said membrane, and removing oxygen enriched mixture from the other side of said membrane.

15. In an apparatus for effecting substantial separation of one gaseous component from a mixture of gases wherein employed in combination are means for supplying selective gas permeation, means for bringing the mixture of gases into contact with one side of said permeation means and means for maintaining a pressure differential between said one side and the opposite side of said permeation means whereby the pressure on said opposite side is lower than the pressure on said one side, the improvement rendering said apparatus specific for helium separation comprising said separating means being a thin, non-porous membrane consisting essentially of a polycarbonate resin of a bisphenol alkane.

References Cited by the Examiner

UNITED STATES PATENTS 2,540,151 2/1951 Weller et al. _____ 55—16
2,966,235 12/1960 Kammermeyer _____ 55—16

REUBEN FRIEDMAN, *Primary Examiner.*

C. N. HART, *Assistant Examiner.*